Patented Sept. 3, 1929.

1,727,306

UNITED STATES PATENT OFFICE.

WILLIAM C. PIVER, OF HILLSIDE, NEW JERSEY, ASSIGNOR TO FRANKLIN M. SIMPSON, OF EAST ORANGE, NEW JERSEY.

METHOD OF MANUFACTURING COMMERCIAL CALCIUM ARSENATE.

No Drawing. Application filed June 24, 1924. Serial No. 722,028.

This invention relates to a simple economical process for manufacturing commercial calcium arsenate in a form adapted for use as an insecticide on leaf tissue, for the purpose of insect control.

An arsenical spray or dust suitable for use on leaf tissue should not contain any appreciable quantities of soluble arsenic, otherwise leaf injury would result. It should be in a finely divided state so that when it is dusted or wet sprayed a maximum covering power and uniform distribution may be had. The compound should also possess distinct adhesive properties, as this characteristic is a valuable factor for efficiency. It is, therefore, evident that calcium arsenate must have these mentioned properties to be effective and efficient as an agricultural insecticide.

To produce commercial calcium arsenate, a thorough and complete combination of calcium oxide and arsenic acid is necessary. Therefore, the usual procedure for making commercial arsenate in a large way is to treat calcium hydroxide in water or milk of lime with arsenic acid.

The present process of making the milk of lime is by adding water to either hydrated lime or to calcium hydroxide formed by slaking calcium oxide in less water than is required for its complete solution. As is well known, the product is sparingly soluble in water. While under these conditions a small percentage of the calcium hydroxide dissolves, one part of calcium oxide to about 779 parts of water at 15° C., the sludge or residue contains a portion which seems to remain in suspension.

When a solution of arsenic acid is run into an ordinary milk of lime suspension, the larger portion of the resulting calcium arsenate formed is insoluble. There is, however, produced at the same time a water soluble calcium arsenate that is not easily eliminated, but remains in the product throughout the processing and prevents the use of the finished product for commercial agricultural insecticidal purposes.

The proportion of the soluble or acid calcium arsenate formed during the reaction between the milk of lime and arsenic acid seems to vary proportionately with the amount of soluble calcium oxide that was present and the amount of the milk of lime in solution. In fact, I have found that the percentage of the soluble calcium arsenate compound formed varies according to the amount in solution of the resulting milk of lime as ordinarily produced in the usual way.

It is quite possible that under ordinary conditions the excess water with the calcium hydroxide acts as a feeble acid and competes with the arsenic acid for the base, when arsenic acid is run into the milk of lime, thereby promoting the formation of an acid calcium arsenate, which is almost entirely water soluble and is not under ordinary conditions converted into the normal or neutral tri-calcium arsenate, or the calcium arsenate compound that is desired.

I have found that the addition of one or more soluble ionized compounds, such as certain soluble bases, acids or salts, to the water in which the hydrated lime is introduced or to the water in which the calcium oxide is being slaked, either prior to or simultaneously with the addition of the arsenic acid, promotes a neutral or normal salt formation when arsenic acid is brought into contact with this lime solution.

To offset, prevent or avoid the formation of this soluble calcium arsenate and to substantially eliminate this injurious soluble arsenical compound from being present in the finished product, I add one or more soluble ionized compounds to the water used in making the milk of lime, such as sodium hydroxide, sodium nitrate, calcium nitrate, sodium chloride or any other soluble compound suitable for the purpose. This soluble chemical is preferably added to the water before or during the slaking of the calcium oxide. If the dry calcium hydroxide is used for making the milk of lime, the soluble chemical is preferably added to the water before the calcium hydroxide is introduced, although either way serves the purpose. My experience has been that solutions containing enough of the dissolved chemical to indicate a specific gravity of 1.02 serve the purpose. The stronger the solution the coarser the product.

The solubility of the calcium hydroxide as well as the physical characteristic of the milk of lime produced in this way is very much modified. For example, if I use a small percentage of caustic soda (sodium hydroxide) dissolved in the water in which the calcium oxide is slaked, the soluble calcium hydroxide is diminished. The hydration of the previously insoluble portion of the calcium hydroxide seems to be incomplete.

These results may be due to definite chemical changes, as it very often happens that the solubility of a compound is sometimes lowered and sometimes raised by the presence of another soluble compound. In other cases the solubility change appears to be connected with a displacement of equilibrium, as when the solubility of a compound in water is diminished by the presence of another soluble compound. In any event, with the same procedure as explained, the same results are obtained, but due possibly to a different cause.

The presence of the soluble compound at the start, when the calcium hydroxide or calcium oxide has ample opportunity to obtain maximum hydration or to form a supersaturated solution, I believe retards this chemical and physical action and conserves the chemical energy of the calcium hydroxide, increasing its power of combining with the arsenic acid to form a normal or neutral basic salt when brought into contact with this acid. The water, which ordinarily is in the form of a hydrate and chemically combined with the calcium oxide and perhaps acts as a feeble acid, is prevented to a certain extent from competing with the arsenic acid for the base.

While I have not determined the maximum or minimum degree of hydration of calcium oxide in ordinary milk of lime emulsion, I have found a varying degree or amount of hydration when hydrated lime or calcium oxide is introduced into or treated with water containing a soluble compound for the purpose of producing milk of lime. The fact that water is a good disassociating or ionizing solvent is well known and it is thought by some that it is the hydration of the ion which is the source of the energy in ionization. Therefore, it is quite possible that, if this theory is true, in this case the ionic energy has been conserved or temporarily held in check and a basic tri-calcium arsenate is produced, due to maximum hydrolysis when arsenic acid is brought into contact with milk of lime, treated in the manner stated.

The addition of small quantities of the soluble base, acid or salt to the water used in making the milk of lime I have found exerts the same influence in eliminating or preventing the formation of soluble calcium arsenate in the finished product as does the presence of a large excess of calcium hydrate in the manufactured material or where the ratio of calcium oxide is over four to one of arsenic pentoxide. Furthermore, my process enables me to produce calcium arsenate containing the maximum percentage, or eight to ten units more of arsenic pentoxide in the insoluble form than can be produced by the ordinary processes, and with the ratio of three and three-quarters to one of calcium oxide to arsenic pentoxide.

To facilitate the reaction and especially for the purpose of controlling the physical characteristics of the finished calcium arsenate, I have found that certain temperatures and certain dilutions are helpful. While almost any temperature from 15° C. to the boiling point of water may be used, 40° to 50° C. is preferable, as higher temperatures coarsen and harden the calcium arsenate produced by this method.

I have also found that dilutions based on the weight of the calcium oxide used should be about one to ten and where the calcium hydroxide or dry hydrate is used for making the milk of lime, the dilutions should be about one to eight, although higher or lower dilutions may be used without interfering with the ultimate result, so far as producing calcium arsenate is concerned, but lower dilutions coarsen the particles and higher dilutions produce a bulkier material. The specific dilutions mentioned give a calcium arsenate of about 85 to 95 cubic inches to the pound, such as is required commercially.

My method is illustrated by the following specific example:—

About 60 gallons of a water solution of calcium nitrate, or some other suitable soluble ionized compound, giving a specific gravity of about 1.003, is run into a tank equipped with stirring apparatus. This solution is slightly warmed and 50 pounds of calcium oxide introduced gradually and allowed to slake thoroughly. The temperature will be found to have risen to about 40° C. Where hydrated lime is used, the percentage of the soluble ionized compound introduced in the water is increased and the temperature brought up to about 40° C. before or after the hydrated lime is thrown in the tank.

The milk of lime solution is thoroughly agitated before further steps in the processing are taken. Then a solution of arsenic acid, containing preferably from 50% to 60% arsenic oxide, is slowly added in such a manner as to keep the temperature in the neighborhood of 50° C. The percentage of arsenic oxide in the solution of arsenic acid may vary widely from the amount stated.

Samples from the batch as it processes are taken at intervals and analysis made for total arsenic oxide content. When this shows the required percentage, the addition of arsenic acid is discontinued and the product dried, milled and packed.

By this method, a basic tri-calcium arsenate containing from 42% to 48% of arsenic pentoxide and less than $\frac{3}{10}$% soluble arsenical compounds is produced. The use of such a water solution of a soluble ionized compound in hydrating the lime results in first producing a coarse-grain and quickly settling calcium hydroxide which prevents the too rapid action of the arsenic acid and compels a more complete reaction. The product is light-bodied and free from coarseness, conforming to every requirement of a good commercial calcium arsenate.

It is possible that I have not given the correct reasons why this result is obtained, as it is recognized that the factors which govern certain chemical phenomena are not very well understood, and I do not claim to know just what takes place when hydrated lime is used to produce milk of lime in a water containing a soluble ionized compound, or when calcium oxide is used for this same purpose. I do know, however, that the resulting calcium hydroxide is very much modified chemically and physically, as is evidenced by its peculiar chemical activity when brought into contact with arsenic acid, after this prior treatment, for the purpose of producing tri-calcium arsenate. The final result is the important consideration and my object has been to obtain a tri-basic, commercially perfected, processed and efficient calcium arsenate.

The calcium compound, which I produce in the process described in the form of a milk of lime or solution of milk of lime and lime water, I believe to be useful in other processes and for other purposes, utilizing a calcium product having the properties set forth, and I intend that this product and the process of producing the same shall be understood as a part of my invention, as well as the utilization of the same in the particular process herein set forth for making a commercial calcium arsenate.

What I claim is:—

1. The method of manufacturing a commercial insecticide containing a high percentage of arsenic oxide in a substantially insoluble form, which comprises the forming of a water solution of a soluble ionized compound, adding lime to said solution, and adding a solution of arsenic acid thereto.

2. The method of manufacturing a commercial insecticide containing a high percentage of arsenic oxide in a substantially insoluble form, comprising the forming of a water solution of a soluble ionized compound, warming this solution, adding lime to said solution, and adding a solution of arsenic acid thereto.

3. The method of manufacturing a commercial insecticide containing a high percentage of arsenic oxide in a substantially insoluble form, comprising the formation of a water solution of a soluble ionized compound, adding lime to said solution, and adding a solution of arsenic acid thereto, the said solutions being agitated continuously during the processing.

4. The method of manufacturing a commercial insecticide containing a high percentage of arsenic oxide in a substantially insoluble form, comprising the forming of a water solution of a soluble ionized compound, slowly adding lime to said solution, and slowly adding a solution of arsenic acid thereto.

5. The method of manufacturing a commercial insecticide containing a high percentage of arsenic oxide in a substantially insoluble form, comprising the forming of a water solution of a soluble ionized compound, the addition to and slaking of lime with said solution, and adding a solution of arsenic acid thereto.

6. The method of manufacturing a commercial insecticide containing a high percentage of arsenic oxide in a substantially insoluble form, comprising the forming of a water solution of a plurality of soluble ionized compounds, adding lime to said solution, and adding a solution of arsenic acid thereto.

7. The method of making a calcium arsenate compound, which consists in first producing a coarse-grain and quickly settling calcium hydroxide by treating lime with a dilute solution of a relatively small quantity of a soluble ionized compound that does not interfere with the reaction of the same with an acid, and then reacting the same with arsenic acid.

8. The method of making a calcium arsenate compound, which consists in first producing a coarse-grain and quickly settling calcium hydroxide by treating lime with a dilute solution of a relatively small quantity of a plurality of different soluble ionized compounds that do not interfere with the reaction of the same with an acid, and then reacting the same with arsenic acid.

9. A calcium compound prepared by hydrating calcium oxide with a water solution of another compound adapted to reduce the amount of calcium hydroxide in solution and reacted with arsenic acid.

10. A calcium compound prepared by dehydrating calcium oxide with a water solution of another compound adapted to produce a coarse-grain and quickly settling calcium hydroxide and reacted with arsenic acid.

11. A calcium compound prepared by dehydrating calcium oxide with a water solution of another compound having a low specific gravity and adapted to reduce the amount of calcium hydroxide in solution and reacted with arsenic acid.

12. A calcium compound prepared by dehydrating calcium oxide with a water solution of another compound having a low specific gravity and adapted to produce a coarse-grain and quickly settling calcium hydroxide of reduced solubility and reacted with arsenic acid.

Signed at Hillside Township, in the county of Union and State of New Jersey this 5th day of May, A. D. 1924.

WILLIAM C. PIVER.